(No Model.)
J. T. MEAD.
FEED WATER PURIFIER.
No. 276,189. Patented Apr. 24, 1883.
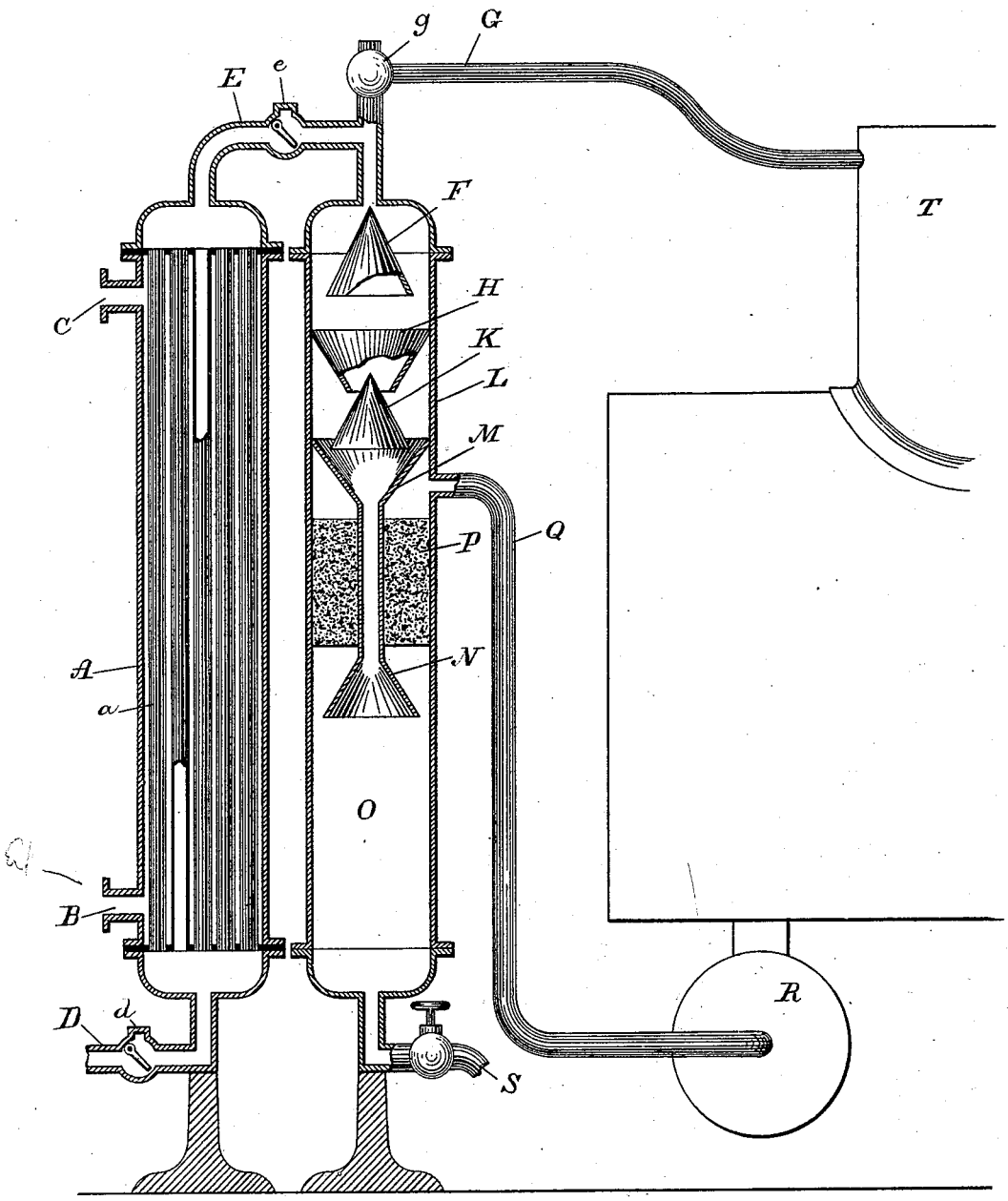
WITNESSES
John T. Mead INVENTOR
by Francis J. Wrig, his
ATTORNEYS

UNITED STATES PATENT OFFICE.

JOHN T. MEAD, OF CLEVELAND, OHIO.

FEED-WATER PURIFIER.

SPECIFICATION forming part of Letters Patent No. 276,189, dated April 24, 1883.

Application filed July 29, 1882. (No model.)

*To all whom it may concern:*

Be it known that I, JOHN T. MEAD, a citizen of the United States, residing at Cleveland, in the county of Cuyahoga and State of Ohio, have invented a new and useful Improvement in Feed-Water Purifiers, of which the following is a specification.

My invention relates to improvements in feed-water purifiers in which the water from the feed-pipes is transmitted through a heater and then brought in contact with live steam from the boiler, and afterward is passed through a filter and thence conducted to the boiler.

The drawing shows a vertical section of my device in connection with a boiler.

In the drawing, A is the shell of the heater. B is the inflow-port for exhaust-steam from the engine. C is the outflow-port for the exhaust-steam which has passed through the heater. D is the inlet from the feed-water. d is check-valve. a a are tubes within the heater. E is the outflow-pipe for water which has passed through the heater, and through which it passes to the purifier. e is check-valve. F is a cone upon which the water from pipe E falls. H is a funnel, which receives and collects the water which falls over cone F. K is a cone upon which water is discharged from funnel H. M is a funnel through which the water is conducted to settling-chamber O. N is an inverted funnel, which is attached to the bottom of funnel M. P is filtering material secured within the purifier. Q is the outflow-pipe from the purifier to the mud-drum R. T is steam-dome of boiler. G is pipe which conveys live steam from the boiler to the purifier. g is a globe-valve. S is a blow-off pipe and cock.

Water is introduced through pipe D, provided with check-valve d, from the feed-pump, and is forced through tubes a a, where it becomes heated by means of the exhaust-steam which has been introduced into the shell of the heater A through port B, and which surrounds and heats the tubes a a. After passing through the heater the water is forced through pipe E and check-valve e, and falls upon cone F, over which it is spread in thin sheets, and, falling from thence into funnel H, is collected therein and discharged upon cone K, where it is again diffused in sheets. During the progress of the water through this portion of the purifier it is brought in contact with the live steam, which has been introduced into the purifier from the steam-dome of the boiler through pipe G, by which means the temperature of the water is raised to the precipitating-point, and, descending to settling-chamber O through funnel M, the mineral and earthy and other impurities are then precipitated and deposited. These impurities collected in the bottom of chamber O may be blown off through blow-off pipe S. The funnels H and M make a tight joint in the shell of the purifier L, thus preventing the unpurified water from mingling with that which has been purified. The funnel N serves to check the upward flow of water from chamber O, thus giving more time for the impurities to be deposited. From the settling-chamber the water rises through the filtering material P, when any impurities which have not been deposited in the chamber O are removed. The water then flows down through pipe Q to mud-drum, and thence into the boiler. The attachment of pipe Q to shell L of purifier is at the level of the water-line of the boiler.

One cone-spreader and one funnel may be omitted from the upper part of the purifier, and the inverted funnel N may also be omitted; but I prefer the construction shown in the drawing.

What I claim as my invention, and desire to secure by Letters Patent, is—

1. The combination, in a feed-water purifier, of heater A, provided with pipes a a, ports B and C, with connecting-pipe E, and purifier L, provided with cone F, funnel H, cone K, funnel M, inverted funnel N, settling-chamber O, filtering material P, blow-off pipe S, and with pipe G for conducting live steam from the boiler to the purifier, and the pipe Q for conducting the purified water to the boiler, substantially as shown and described.

2. In combination with a steam-boiler and a feed-water heater, a purifier constructed with a shell, L, containing one or more cones upon which the water may fall when coming from the heater, and one or more funnels forming a tight joint in the shell, said cone or cones and said funnel or funnels being above the outlet-pipe Q and the filtering material P, and with settling-chamber O and filtering material P, said purifier being connected with the boiler by suitable pipes, through which live steam is conducted and brought in contact with the water as it falls over said cone or cones and before it is passed through filtering material, and being connected with the boiler by pipe Q, attached to said purifier at a level with the water-line of the boiler, substantially as shown and described.

JOHN T. MEAD.

Witnesses:
FRANCIS J. WING,
W. H. DUNN.